United States Patent [19]
Geist et al.

[11] Patent Number: 4,609,446
[45] Date of Patent: Sep. 2, 1986

[54] WATER-DISPERSIBLE BINDING AGENTS FOR CATIONIC ELECTRODEPOSITABLE COATINGS AND METHOD FOR MANUFACTURING SAME

[76] Inventors: Michael Geist, Rubensstr. 251, 4400 Münster; Günther Ott, von Holte Str. 101a, 4400 Münster-Wolbeck; Georg Schön, Schillerstr. 2, 4416 Everswinkel, all of Fed. Rep. of Germany

[21] Appl. No.: 568,626

[22] Filed: Jan. 6, 1984

[30] Foreign Application Priority Data

Jan. 10, 1983 [DE] Fed. Rep. of Germany ....... 3300583

[51] Int. Cl.$^4$ .................. C08G 59/14; C08L 63/00; C25D 13/00; C09D 5/44
[52] U.S. Cl. .................. 204/181.7; 523/414; 523/415; 523/416; 525/504; 525/528; 524/901; 528/109; 528/110; 528/111; 528/337; 528/341; 528/361
[58] Field of Search .............. 528/109, 110, 111, 337, 528/341, 361; 525/528, 504; 523/415, 416, 414; 524/901; 204/181.7

[56] References Cited

U.S. PATENT DOCUMENTS

| | | | |
|---|---|---|---|
| 3,936,405 | 2/1976 | Sturni et al. | 523/414 |
| 3,937,679 | 2/1976 | Bosso et al. | 523/416 |
| 4,102,863 | 7/1978 | Buchwalter et al. | 528/111 |
| 4,148,772 | 4/1979 | Marchetti et al. | 528/110 X |
| 4,260,720 | 4/1981 | Bosso et al. | 524/901 X |
| 4,339,369 | 7/1982 | Hicks et al. | 528/111 X |
| 4,396,649 | 8/1983 | Bailey et al. | 528/111 X |
| 4,419,467 | 12/1983 | Wismer et al. | 528/110 X |

Primary Examiner—Earl Nielsen
Attorney, Agent, or Firm—Kenyon & Kenyon

[57] ABSTRACT

The disclosed invention involves water-dispersible binding agents for cationic electrodeposition coatings and a method for making them, the binding agents are the reaction product of (A) epoxy resins having a molecular weight greater than about 350; (B) polyfunctional, alcohols, carboxylic acids and/or SH-compounds having a molecular weight between about 500-5000 and (C) aminoalcohols with at least one protected primary or tertiary nitrogen atom.

16 Claims, No Drawings

WATER-DISPERSIBLE BINDING AGENTS FOR CATIONIC ELECTRODEPOSITABLE COATINGS AND METHOD FOR MANUFACTURING SAME

The invention relates to water-dispersible binding agents for cationic electrodepositable coatings derived from modified epoxy resins.

Cationic water-dispersible synthetic resins are known as binding agents for electrodepositable coatings, for example, Geman Patent publication DE-OS 2 701 002 describes such a resin which is a reaction product of a polyepoxy with a molecular weight of at least 350, a secondary amine and an organic polyol with at least two alcoholic primary hydroxyl groups. The resins are produced by lengthening the chains of high-molecular weight polyepoxies with at least 2 epoxy groups per molecule. The chain lengthening is achieved by an organic polyol and the water dispersibility is obtained by the addition of a secondary amine.

This and other known synthetic resins are frequently used as primers, i.e., the articles coated therewith are given an additional cover varnish layer.

It is an object of the invention to describe water-dispersible synthetic resins for cationic electrodepositable resins with the use of which improved coatings are obtained and for which, in particular, an enlarged raw material base is available.

According to the present invention, this problem is solved for binding agents of the type mentioned at the outset of the provision that they are reaction products of:

(A) epoxy resins with a molecular weight of at least 350, (B) polyfunctional alcohols, carboxylic acids and/or SH-compounds with a molecular weight of 300 to 5000 and (C) amino alcohols with at least one protected primary or a tertiary nitrogen atom.

The new cationic synthetic resins of this invention are generated by chain lengthening of polyepoxies with at least two epoxy groups per molecule. The chain lengthening is achieved by an organic polyol which may be low-molecular or high-molecular weight and contains at least two and preferably likewise two alcoholic primary hydroxyl groups in the molecule.

The chain lengthening is preferably carried out in the presence of a tertiary amine as a catalyst.

At the polyepoxy is further added an amino alcohol, and the nitrogen atom of the amino alcohol is protected primary or a tertiary nitrogen atom.

It was found that due to the chain lengthening of the polyepoxies, the breakdown voltage of the films produced is improved. At the same time, also the flowability and the fluidity of the films are improved. In some cases, an increase of the flexibility is observed. Softer films are obtained and the deposition can take place at lower bath temperatures.

With the present invention, any materials can be used as polyepoxies (component A) which contain two or more epoxy groups in the molecule. Preferred are compounds with two epoxy groups in the molecule. The polyepoxies have a relatively high molecular weight of at least 350 and preferably, 350 to 2000. The polyepoxies may be, for instance, polyglycidyl ethers of polyphenols, such as bisphenols, e.g., bisphenol A. These polyepoxies can be prepared by etherification of a polyphenol with an epihalohydrin in the presence of alkali. Examples for suitable phenol compounds are bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tertiary-butylphenyl)-2,2-propane, bis(2-hydroxynaphthyl)methane, 1,5-dihydroxynaphthalene. In some cases it is desirable to obtain polyepoxies of higher molecular weight with aromatic groups. This can be achieved by reacting the above-mentioned diglycidyl ethers with a polyphenol such as bisphenol A and then further reacting the product obtained with epichlorohydrin, producing a polyglycidyl ether.

Another suitable class of polyepoxies are polyglycidyl ethers of phenolic novolak resins.

Likewise suited are similar polyglycidyl ethers of multivalent alcohols such as ethylene glycol, diethylene glycol, triethylene glycol, 1,2-propylene glycol, 1,4-propylene glycol, 1,5-pentane diol, 1,2,6-hexane triol, glycerin and bis(4-hydroxycyclohexyl)2,2-propane.

Also polyglycidyl esters of polycarboxylic acids can be used.

The polyepoxies preferred for the invention are the polyclycidylethers of polyphenols. Among them, most preferred are those with molecular weights of at least 350 and preferably in the range between 350 and 2000.

The polymeric polyepoxies can be reacted with the organic polyols while the chains are lengthened and the molecular weight is increased. The chain-lengthening agent acts as a chemical bridge between the lower-molecular weight polymer chains and connects them to form products of higher molecular weight. This reaction occurs between the primary alcoholic hydroxyl groups while the epoxy ring is opened and ether bonds and a secondary hydroxyl group are formed.

The lengthening of the chains is advantageously achieved by mixing the organic polyol and reaction at a temperature of about 120° to 150° C. in the presence of a catalyst, such as a tertiary amine. An inert solvent can be present during the reaction. Examples of suitable tertiary amines are benzyldimethylamine, dimethylcyclohexylamine, dimethylethanolamine and triethylamine. Catalysts other than amines can also be used.

The chain lengthening agents (component B) are organic polyols which contain at least two and preferably only two hydroxyl groups. Mixtures of polyols can also be used.

The organic polyols may have either a low or a high molecular weight and have in general molecular weight of about 100 to 3000, and preferably about 500 to 1000.

The polyols of interest for the invention include low-molecular weight diols and higher polymeric polyols such as polyester polyols and polyether polyols. Especially preferred are polyester polyols and, among them, the polycaprolactone polyols.

Well-suited diols are generally known. Specific examples are 1,6-hexane diol, 1,8-octane diol and cyclohexanedimethanol. Likewise suitable are polyols with ether bonds such as diethylene glycol and triethylene glycol. Examples of polymeric polyols include polyalkyleneether polyols and polyester polyols, especially hydroxyl-containing lactone polyesters.

Suitable polyalkylene ether polyols which can be used correspond to the following formula:

where the substituent R is hydrogen or a low alkyl radical with various substituents; n is typically 2 to 6 and m is 2 to 100 or even larger. Examples are poly(oxytetramethylene)glycols and poly(oxyethylene)glycols.

The preferred polyalkyleneether polyols are poly(oxytetramethylene)glycols with a molecular weight in the range from 500 to 3000.

The polyester polyols can likewise be used as polymeric polyol component in the invention. The polyester polyols can be prepared by polyesterification of organic polycarbonic acids or their anhydrides with organic polyols which contain primary hydroxyl groups. Customarily, the polycarbonic acids and the polyols are aliphatic or aromatic dicarbonic acids and diols.

With the invention can further be used polyester polyols which are derived from lactones. These products are obtained by reaction of a lactone such as an ε-caprolactone, with a polyol. Such products are described in U.S. Pat. No. 3,169.945.

As polyfunctional SH-compounds (component B) can be considered reaction products of organic dihalogenides with sodium polysulfide. Other SH-compounds are, for instance, reaction products of hydroxyl-group-containing linear polyesters, polyethers or polyurethanes with mercapto carbonic acids such as mercapto acetic acid, 2-mercapto propionic acid, 3-mercapto propionic acid, mercapto butyric acid and similar ones.

For the amino alcohols used as component C, which have a concealed primary amine or a tertiary amine, are suited particularly di- and trialkanol amines which correspond to the general structure formula

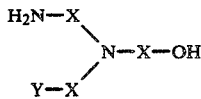

where X=alkylene, branched, unsaturated or cycloaliphatic alkylene, arylene,
Y=NH$_2$, H.

Examples for this are (N,N-methylhydroxyethyl)propane diamine-1,3,N,N,N-di-2-aminoethyl-2-hydroxyethylamine,N,N,N-2-aminoethyl-3-amino-propyl-2-hydroxyethylamine.

There are further suitable as amino alcohols (N,N-alkylaminoalkyl)-hydroxy alkane acid amides and (N,N-diaminoalkyl)-hydroxy alkane-acid amides of the general structure formula

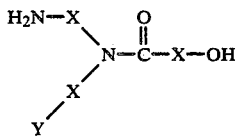

where X=alkylene, branched, unsaturated or cycloaliphatic alkylene, arylene:
Y=H, NH$_2$.

These aminoalcohols can be employed individually or as a mixture.

If aminoalcohols with primary amino groups are used, these amino groups must be concealed (capped) before they are reacted with the epoxy groups, i.e., for instance converted into ketimides. Ketimides are reaction products of primary amino groups with ketones. The ketones suitable therefor correspond to the general structure formula

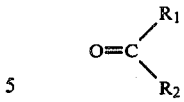

in which R$_1$ and R$_2$ are organic radicals which are substantially inert to the ketimine bond. Preferably, R$_1$ and R$_2$ are short alkyl radicals (2 to 4 carbon atoms). It is frequently advantageous to use a ketone which boils below or near the boiling point of water or readily distills-over with water. The reaction of the ketone with the primary amine can be illustrated by the following formula:

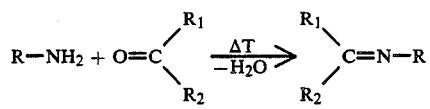

Preferred examples of ketones include acetone, methylethylketone, diethyl ketone, methylpropyl ketone, methylisopropyl ketone, methyl-n-butyl ketone, methylisobutyl ketone, ethylisopropyl ketone, cyclohexanone, acetophenone. Especially preferred ketones are acetone, methylethyl ketone and methylisobutyl ketone.

After the reaction, the product obtained should not be subjected to conditions, under which the ketimine group is decomposed, forming a free amine group, as long as the possibility of gelling or crosslinking by primary amino groups exists. The ketimine is decomposed if dispersed in water.

The invention also relates to a method for manufacturing the binding agents, which is characterized by the features that
(A) epoxy resins with a molecular weight of at least 350 are reacted with
(B) polyfunctional, alcohols, carboxylic acids and/or SH-compounds with a molecular weight of 300 to 5000 as well as, for achieving the required water dispersibility, with
(C) amino alcohols with at least one blocked primary or a tertiary nitrogen atom.

The invention relates further to the use of the binding agents for electrodeposition coating baths.

To obtain highly resistant coatings, using the binding agents according to the invention, it is advantageous to add to the electroimmersion varnish a cross-linking agent which causes the cross-linking of the binding agent at elevated temperatures, or to modify the binding agent in such a manner that it contains reactive groups which cause self-cross-linking at elevated temperatures. A self-cross-linking system can be obtained advantageously by the provision that the binding agent is reacted with a partially blocked polyisocyanate which has in the average one free isocyanate group per molecule and the blocked isocyanate groups of which are stable at room temperature and are unblocked at elevated temperatures and react with the hydroxyl groups generated by the opening of the epoxy rings, forming urethane.

Frequently used methods for cross-linking binding agents have been published in the following Offenlegungsschriften: DE-OS 2 057 799; European Patent Applications 12 463 and 4090; and DE-OS 2 752 256.

If cross-linking agents are used, they amount as a rule to about 5 to about 60% by weight of the binding agent.

Examples of suitable aminoplast cross-linking agents are the hexamethyl ether of hexamethylol melamine, the triethyltrimethyl ether of hexamethylol melamine, the hexabutyl ether of hexamethylol melamine and the hexamethyl ether of hexamethylol melamine and polymeric butylized melamine formaldehyde resins.

Urea aldehyde cross-linking agents can be prepared in a manner known per se by reacting urea and an aldehyde up to the resol stage and alkylizing the reaction product with an alcohol under acid conditions, whereby an alkylized urea aldehyde resin is obtained. An example of a suitable cross-linking agent on the basis of a urea aldehyde resin is a butylated urea formaldehyde resin.

Blocked polyisocyanates can also be used as cross-linking agents. With the invention, any polyisocyanates can be used, in which the isocyanate groups have been reacted with a compound, so that the blocked polyisocyanate that has been formed is stable vis-a-vis hydroxyl groups at room temperature, but does react at elevated temperatures, as a rule in the range of about 90° to about 300° C. In the preparation of the blocked polyisocyantes, any organic polyisocyanates can be used which are suitable for cross-linking.

To give to the synthetic resin a cationic character sufficient for electrical deposition, the neutralization nitrogen is kept in general preferably between 0.3 and 3 milliequivalents per gram of all the resin solids.

If the amino alcohol is modified by a ketimine group, it is advantageous if the chain lengthening takes place prior to the addition of the ketimine-containing amino alcohol on the polyepoxy in order to keep the decomposition of the ketimine as low as possible. The resin-like products according to the invention can contain epoxy or may be free of it, depending on the stoichiometric conditions in the amino alcohol addition while the chains are lengthened. If a ketimine-containing amino alcohol is used, the ketimine group of the resin-like product is hydrolyzed during the dispersion in water and any epoxy group that may still be present reacts with the primary amine, which is formed by hydrolysis of the ketimine.

Aqueous dispersions of the synthetic resin products according to the invention are highly suitable as coating compounds, especially for making coatings by electrical deposition. The coating compounds, however, can also be applied to the substrates in the conventional manner. For dispersion in water, the resin-like products are neutralized so as to form cationic groups, for instance, salts of tertiary amines and, in the case of hydrolized ketimine-containing resins, salts of primary amines.

The products are neutralized by reacting part or all of the amino groups by a water-soluble acid, for instance, formic acid, acetic acid or phosphoric acid. The degree of neutralization depends on the specific resin and is in general sufficient so that only so much acid is added that the resin is dispersible in water.

The concentration of the resin-like products in the aqueous medium depends on the process parameters used and is as a rule not critical. Customarily, water is the main component of the aqueous dispersion. The aqueous dispersion can contain, for instance, about 5 to about 50% by weight resin solids.

In addition to water, the aqueous medium can contain a coalesing solvent. By co-using a coalescing solvent, a better appearance of the film is achieved in some cases. Such solvents include hydrocarbons, alcohols, esters, ethers and ketones. The preferred coalescing solvents are monoalcohols, glycols and polyols, and also ketones and ether alcohols. Specific coalescing solvents are isopropanol, butanol, isophorone, 4-methoxy-methyl-pentanone-2, ethylene- and propylene glycol, monoethyl-, monobutyl- and monohexyl ethers of ethylene glycol and 2-ethylhexanol. The quantity of the coalescing solvent is not critical and in general, between 0.1 and 40% by weight, and preferably 0.5 to 25% by weight, referred to the total weight of the aqueous medium, are used.

In most cases, the aqueous dispersion also contains pigments and other customary additive such as surface-active agents. The customary pigments can be used such as iron oxides, lead oxides, strontium chromate, carbon black, carbon dust, titanium dioxide, barium sulfate and colored pigments such as cadmium-yellow, cadmium-red, chromium-yellow and the like. The pigment content of the dispersion is as a rule expressed as the ratio of the pigment to the resin. With the invention, the pigment-to-resin ratio is as a rule in the range from 0.01 to 5:1. Other customary additives can as a rule be present in the dispersion in quantities of about 0.01 to 3% by weight, referred to the total weight of the resin solids.

In the electrical deposition of the synthetic resins according to the invention, the latter are brought into contact with an electrically conducting anode and an electrically conducting cathode, the cathode being the surface to be coated. During the contact with the aqueous dispersion, an adhering film of the coating compound is deposited on the cathode when a voltage is applied between the electrodes.

The conditions, under which the electrical deposition takes place, are generally similar to those which are used for the electrical deposition of other coating compounds. Customarily, the voltage is between about 50 and 500 volts.

Advantageously, the dispersion has a pH between 3 and 9 during the electrical deposition.

The electrical deposition of the synthetic resins according to the invention can be made on any substrate, especially on metals such as steel, aluminum, copper or magnesium. After the electrical deposition, the coating can be hardened by heating to elevated temperatures. For this purpose, temperatures of 90° to 200° C. and periods of 1 to 30 minutes are as a rule considered.

To ensure fast and complete hardening, it is sometimes advantageous to have a catalyst in the coating compound. The amount of catalyst used should be sufficient to accelerate the hardening of the deposited film. Typical amounts are amounts from about 0.05% to about 4%, referred to the weight of the entire resin solids. As a rule, about 2% by weight of such a catalyst are used. If, however, the hardening temperatures are high enough, the catalyst can be dispensed with.

The invention thus also relates to a method for the electrophoretic coating of an electrically conducting substrate, connected as the cathode, of an aqueous bath on the basis of cationic binding agents at least partially neutralized with acids, where the binding agents have been made self-cross-linking by reaction, or the bath contains an additional cross-linking agent, characterized by the feature that the binding agents are reaction products of (A) epoxy resins with a molecular weight of at least 350, (B) polyfunctional, alcohols, carboxylic acids and/or SH-compounds with a molecular weight of 300 to 5000 and (C) amino alcohols with at least one blocked (capped) primary or a tertiary nitrogen atom as well as a coated substrate obtained by the method.

The invention will be explained further in the following examples. All data on parts and percentages are weight data unless expressly stated otherwise.

EXAMPLE 1

Preparation of Binding Agent I 914 parts of a commercially available epoxy resin on the basis of bisphenol A (equivalent epoxy weight 188), 327 parts of ester polyol (OH number 208.3) and 79 parts xylol are placed in a 4-liter reactor. This mixture is heated in a vacuum to 117° C. and kept at this temperature for half an hour. In the process, water is azeotropically circulated out. The apparatus is then vented to normal pressure and 277 parts bisphenol A and 1.9 parts dimethylbenzylamine are added.

Due to the setting-in exothermic reaction, the temperature rises to 165° C. The preparation is held at this temperature until an equivalent epoxy weight of 698 is reached. The preparation is then cooled down to 126° C. and another 3.9 parts dimethylbenzylamine are added. The temperature again rises slightly. The preparation is kept at 130° C. until an equivalent epoxy weight of 1164 is reached. Then, 268 parts of a reaction product of isopropanolamine and excess methylisobutyl ketone (amine equivalent of the ketimine 223) are added. The preparation is kept at 130° C. for 3 hours and then, 140 parts hexylene glycol and 1208 parts of the cross-linking agent I are added. These components are then intermixed for 15 minutes.

In the meantime, a dispersion bath of 1398 parts distilled water, 34 parts glacial acetic acid and 50 parts emulsifier solution is prepared. The acid number of this dispersion bath is 23. 2600 parts of the above-described resin solution are then stirred into the bath. After one hour, another 1640 parts distilled water are added and after 30 minutes, another 1000 parts are added. The finished dispersion is then filtered. The dispersion has the following characteristics:

| Solids | 29.7% | pH value | 6.34 |
|---|---|---|---|
| MEQ acid | 0.413 | MEQ base | 0.455. |

EXAMPLE 2

Preparation of Binding Agent II 979 parts of a commercially available epoxy resin on the basis of bisphenol A (equivalent epoxy weight 188), 350 parts of a ester polyol (OH number 208.5) and 85 parts xylol are placed in a 4-liter reactor. This mixture is heated in a vacuum to 117° C. and kept at this temperature for half an hour. In the process, water is circulated out azeotropically. The reactor is then vented to normal pressure. Then, 297 parts bisphenol A and 2 parts dimethylbenzylamine are added. The setting-in reaction is heavily exothermic and the temperature rises in the process to 165° C. The preparation is kept at this temperature until an equivalent epoxy weight of 690 is reached and, after cooling down to 125° C., 4 parts dimethylbenzylamine are added. The temperature then rises again; it is kept at 132° C. until an equivalent epoxy weight of 1155 is reached. Then, 288 parts of a reaction product of isopropanolamine and excess methylisobutyl ketone (amine equivalent weight of the reaction product 233) are added. The preparation is kept at 132° C. for another 3.5 hours and then, 150 parts hexylene glycol and 1284 parts of the cross-linking agent II are added. These components are mixed-in for 20 minutes.

In the meantime, a dispersion bath of 1866 parts deionized water, 65 parts emulsifier solution and 45 parts glacial acetic acid is prepared. A resin solution is stirred into this bath. After one hour, another 2.175 parts deionized water are added and mixed-in for 15 minutes. Then, the dispersion is filtered. The dispersion has the following characteristics:

| Solids | 35.5% | pH value | 6.4 |
|---|---|---|---|
| MEQ acid | 0.444 | MEQ base | 0.538. |

Preparation of a Cross-Linking Agent I

A reactor which is equipped with a heating device, a cooler, a stirrer, a thermometer, an output line which leads to a washing device, and a device for feeding-in nitrogen, is charged with 12,280 parts toluylenediisocyanate (mixture of about 80% 2,4-toluylenediisocyanate and about 20% 2,6-toluylenediisocyanate). Nitrogen is fed-in and the cooler is switched on. In the course of 5 hours, 5,550.5 parts 2-ethylhexanol are added gradually, while the temperature rises gradually to 50° C. While the temperature of 50° C. is being maintained, another 3,649.5 parts 2-ethylhexanol are added in the course of 4 hours. The reaction mixture is held for 75 minutes at 50° C.; then the cooler is switched off and 3.6 parts dibutyltinlaurate are added. The heating device is switched on and the reaction mixture is heated to 65.6° C. in the course of 45 minutes. In the course of two hours and 50 minutes, 3,184 parts 1,1,1-trimethylol propane are added, while the temperature rises from 65.6° to 120° C. The reaction mixture is held at this temperature for 90 minutes, and 10,560 parts of 2-ethoxyethanol are added. The product obtained is a solution of a polyurethane cross-linking agent.

Preparation of a Cross-Linking Agent II 2,340 g glycidyl ester of the 2-methyl-2-ethyl heptanoic acid are heated with 2,073 g trimellitic cid anhydride in a reaction vessel to 130° C. The heavily exothermic reaction starts out then. By external cooling, the reaction is kept at 150° C. until an acid number of 183 is reached. Then the mixture is cooled down to 90° C. and 1,450 g MIBK are added (MIBK=methylisobutyl ketone). Subsequently, 835 g propylene oxide are added slowly dropwise. At an acid number less than 2, the reaction is broken off. The solids of the resin solution are adjusted with further MIBK to 70%.

Preparation of a Pigment Paste 146 g of a reaction product of an epoxy resin and an equivalent epoxy weight of 890 and diethanolamine lactic-acid salt are placed in a vessel with 199 g deionized water. To this are added 200 g $TiO_2$, 48 g extender on the basis of aluminum silicate, 11 g lead silicate as well as 3 g carbon black. The starting components are comminuted in a milling set to a Hegman fineness of 5 to 7. Thereupon, another 102 g deionized water are added so as to reach the desired paste consistency. The grey pigment paste is very stable in storage.

Preparation of the Electro-deposition Bath 1.917 parts deionized water and 25 parts 10-% acetic acid are placed in a vessel. To this are added 2,303 parts of the binding agent dispersion I. This mixture is reacted with 775 parts of the above-described pigment paste. The coating bath has the following characteristics:

| Solids | 19.5% | pH value | 6.2 |
| MEQ acid | 0.37 | MEQ base | 0.57. |

The films deposited from the coating bath at 25° C. during 2 minutes are baked-on for 20 minutes at 185° C. The flow of the films thereafter was good, and the films has a layer thickness of 16 μm.

Preparation of the Electro-deposition Coating Bath II 2000 parts deionized water and 25 parts 10-% acetic acid are placed in a vessel. To this are added 1,926 parts of the binding agent dispersion II. To the mixture are added 775 parts of the above-described pigment paste. To adjust the solids, another 274 parts deionized water are added. The coating bath has the following characteristics:

| Solids | 20% |
| pH | 6.2. |

The films deposited from this coating preparation at 25° C. during 2 minutes are baked on during 20 minutes at 185° C. The completely hardened film exhibits very good mechanical-technological properties.

| Erichsen cupping | 7 mm |
| Ball impact test according to ASTM-Standard D 2795-69, | |
| load limit of front side | 92.2 cm. kg |
| back side | 92.2 cm. kg |

EXAMPLE 3

Preparation of Binding Agent III 1,018 parts of a commercially available epoxy resin on the basis of bisphenol A (equivalent epoxy weight 188), 435 parts polytetramethylene glycol (OH number 174.5) and 72 parts xylol are placed in 4-liter reaction. This mixture is heated in a vacuum to 112° C. and held at this temperature for half an hour, while water is circulated-out azeotropically. Then, the apparatus is flushed out with nitrogen and provided with a nitrogen veil during the further reaction. Then, 308 parts bisphenol A and 2.7 parts dimethylbenzylamine are added. The resulting reaction is strongly exothermic; the temperature rises to 170° C. The preparation is held at this temperature until an equivalent epoxy weight of 610 is reached. Then, the preparation is rapidly cooled down to 126° C. and another 5.5 parts dimethylbenzylamine are added. The temperature is allowed to rise at 133° C. and is held for the further reaction at 133° to 135° C. until an equivalent epoxy weight of 1,250 is reached. Then, 180 parts of the 70% reaction product is MIBK of 2-(di-2-aminoethyl)aminoethanol and MIBK and 250 parts of the 70% reaction product in MIBK of neopentanolamine and MIBK are added. The preparation is held for another 3 hours at a temperature of about 133° C.; then 194 parts hexylene glycol are added and in the process, the preparation is cooled down to 90° C. Then, 755 parts of the cross-linking agent I are added and intermixed for 20 minutes.

In the meantime, a dispersion bath of 2,179 parts deionized water, 39 parts glacial acetic acid and 51 parts of an emulsifier solution is prepared. The acid number of the bath is about 16.7. Therein, the above-described resin solution is now dispersed. An upper temperature limit of about 50° C. is maintained by cooling. After one hour, another 1,006 parts deionized water are added and are mixed-in for half an hour. Thereupon, the dispersion can be filtered. The dispersion has solids of 35.2%. The pH-value is about 6.7.

(MIBK=methylisobutyl ketone)

Preparation of the Electro-deposition Bath III

The electrodeposition coating is made with the binding agent dispersion III according to the following prescription:

| 2,257 parts | deionized water |
| 25 parts | 10% acetic acid |
| 1,943 parts | binding agent dispersion |
| 775 parts | pigment paste. |

From this coating bath, varnish films were deposited on phosphatized sheet steel at 25° C. during 2 minutes with 280 V. The films are rinsed off with and deionized water and baked-on for 20 minutes at 185° C. in a circulating-air drying cabinet. The films flow smoothly and have a layer thickness of 23 μm.

What is claimed is:

1. A water-dispersible binding agent for cationic electrodepositable coatings derived from modified epoxy resins, which comprise the reaction product of:
   (A) a polyepoxy resin with a molecular weight of at least 350,
   (B) at least one chain lengthening agent selected from the group consisting of a polyfunctional alcohol, polyfunctional carboxylic acid and a polyfunctional SH-compound with a molecular weight of about 300 to 5000 and
   (C) an amino alcohol with at least one protected primary or tertiary nitrogen atom selected from the group having the general formula:

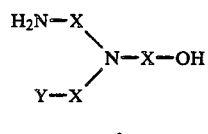

and

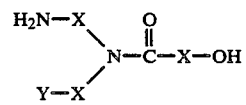

wherein X is a branched, linear, unsaturated or cycloaliphatic alkylene, or arylene group, and Y is an amino group or hydrogen.

2. Binding agent according to claim 1, wherein component A is an epoxy resin derived from bisphenol A.

3. Binding agent according to claim 1, wherein component A is a polyglycidyl ester.

4. Binding agent according to any one of claims 1 to 3, wherein the molecular weight of component B is 500 (sic) to 3000.

5. Binding agent according to any one of claims 1 to 3, wherein component B is a linear polyester.

6. Binding agent according to any one claims 1 to 3, wherein component B is a linear polyurethane, a linear polyamide or a linear polyalkylene dicarboxylic acid.

7. Binding agent according to any one of claims 1 to 3, wherein component B is a polythioether.

8. Binding agent according to any one of claims 1 to 3, wherein share of component B is 10 to 50% by weight, based on the entire binding agent.

9. Binding agent according to any one of claims 1 to 3, wherein they have been reacted with a partially blocked polyisocyante which in the average has one free isocyanate group per molecule and the blocked isocyanate groups of which are stable at room temperature.

10. Method for manufacturing water-dispersible binding agents for cationic electrodepositable coatings comprising:

reacting the following components to provide a water dispersable electrodepositable coating:

(A) an epoxy resin with a molecular weight of at least 350 with (B) a polyfunctional, alcohol, carboxylic acid and/or SH-compound with a molecular weight of 300 to 5000, with (C) an amino alcohol with at least one protected primary or a tertiary nitrogen atom selected from the group having the general formula:

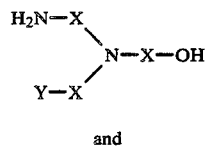

and

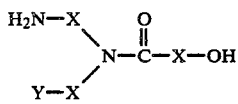

wherein X is branched, linear, unsaturated or cycloaliphatic alkylene, or arylene group; and Y is an amino group or hydrogen.

11. Water-dispersible binding agents for cationic electrodispositable coatings derived from modified epoxy resins, which comprise the rection product of:

(A) an epoxy resin
(B) a polyfunctional alcohol, carboxylic acid and/or SH-compound and
(C) an amino alcohol with at least one protected primary or a tertiary nitrogen atom selected from the group having the general formula:

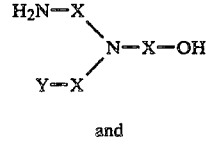

and

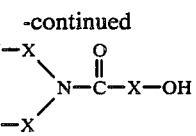

wherein X is a branched, linear, unsaturated or cycloaliphatic alkylene or arylene group; and Y is an amino group or hydrogen.

12. A method for electrodeposition coating of an electrically conducting substrate, comprising the steps of:

preparing an electrodeposition bath comprising an aqueous dispersion including a cross-linking agent and a binding agent comprising the reaction product of:

(A) a polyepoxy resin with a molecular weight of at least 350,
(B) at least one chain lengthening agent selected from the group consisting of a polyfunctional alcohol, polyfunctional carboxylic acid and polyfunctional SH-compound, said chain lengthening agent having a molecular weight of about 300 to 5000 and
(C) an amino alcohol with at least one protected primary or a tertiary nitrogen atom selected from the group having the general formula:

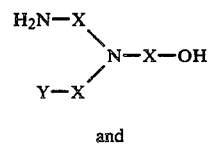

and

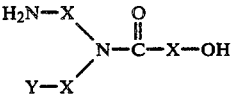

wherein X is a branched, linear, unsaturated or cycloaliphatic alkylene, or arylene group, and Y is an amino group or hydrogen;

immersing the electrically conducting substrate in said bath; and passing an electric current through said bath so that the substrate is a cathode and said binding agent and cross linking agent are deposited as a film on said substrate.

13. The method recited in claim 12 wherein said cross-linking agent is chemically bound to said binding agent.

14. The method recited in claim 12 or 13 further comprising the step of curing said film.

15. The coated substrate produced by the method of claim 14.

16. A water dispersible binding agent for cationic electrodepositable coatings derived from modified epoxy resins which comprises the reaction product of:

(A) a polyepoxy resin with a molecular weight of at least 350,
(B) a linear polyether having at least two functional groups selected from the group consisting of hydroxyl, carboxyl and thiol, and having a molecular weight of about 300 to 5000, and
(C) an amino alcohol with at least one protected primary or tertiary nitrogen atom selected from the group having the general formula:

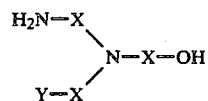
and
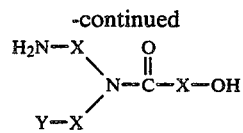
wherein X is a branched, linear, unsaturated or cycloaliphatic alkylene, or arylene group, and Y is an amino group or hydrogen.
* * * * *